No. 630,808. Patented Aug. 8, 1899.
E. GRUENINGER.
AUTOMATIC LIQUID WEIGHING FAUCET AND SCALE.
(Application filed Sept. 6, 1898.)
(No Model.)
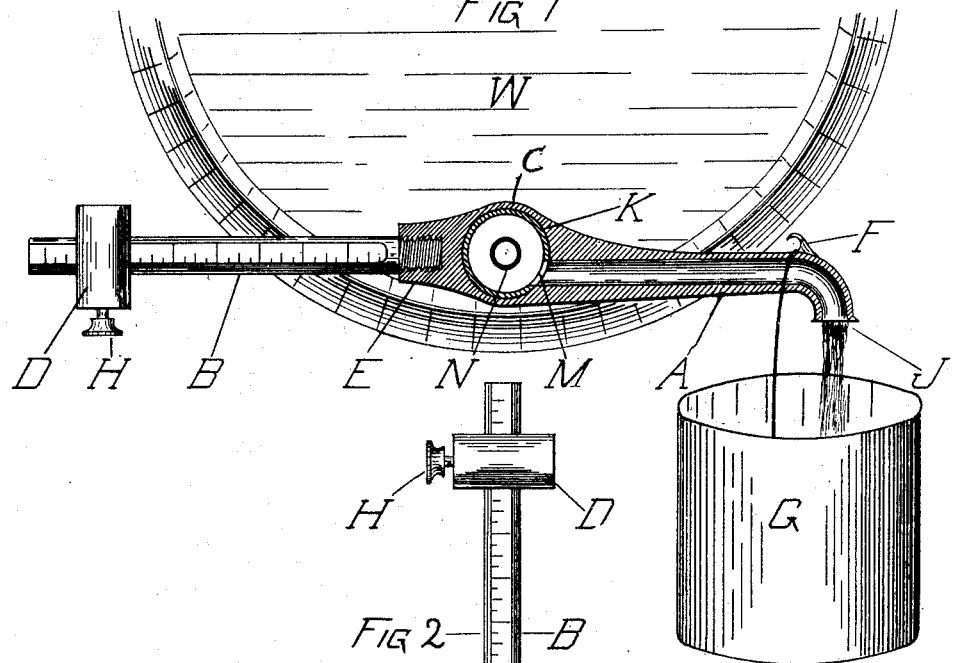
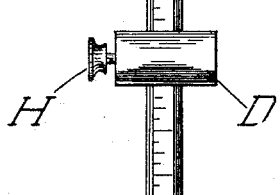
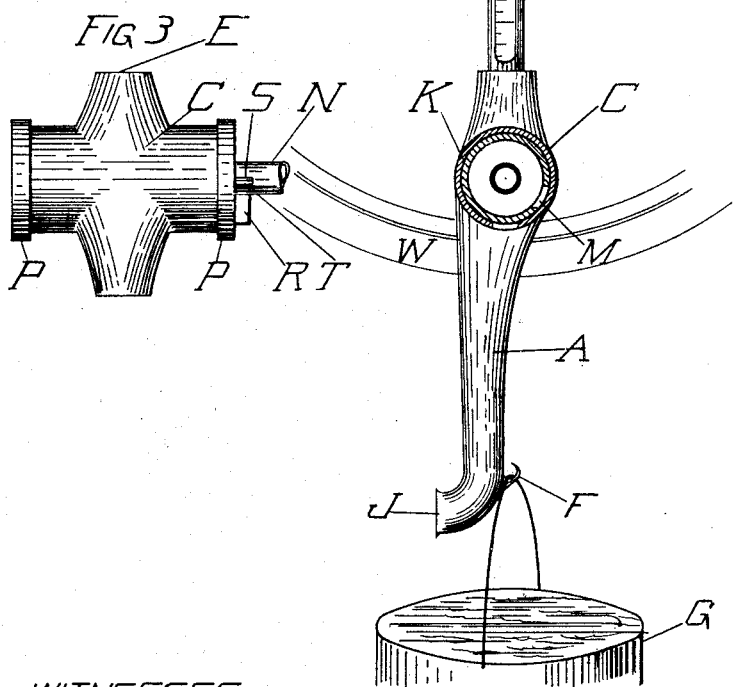
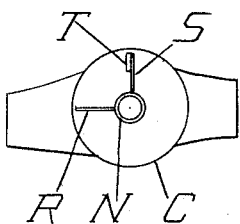
WITNESSES
INVENTOR

UNITED STATES PATENT OFFICE.

EDWARD GRUENINGER, OF CINCINNATI, OHIO, ASSIGNOR OF ONE-HALF TO EUGENE RITZLER, OF SAME PLACE.

AUTOMATIC LIQUID-WEIGHING FAUCET AND SCALE.

SPECIFICATION forming part of Letters Patent No. 630,808, dated August 8, 1899.

Application filed September 6, 1898. Serial No. 690,295. (No model.)

*To all whom it may concern:*

Be it known that I, EDWARD GRUENINGER, a citizen of the United States, residing at the city of Cincinnati, in the county of Hamilton and State of Ohio, have invented certain new and useful Improvements in Automatic Liquid-Weighing Faucets and Scales, of which the following is a specification.

The object of my invention is to produce a cheap, simple, and efficient device for automatically measuring liquids which are usually drawn from a faucet, thus making it possible to give systematic and equal weight to the customer. The device working automatically to cut off the supply, too much weight cannot be given. All the defects of the ordinary faucet are overcome and obviated. It can be applied to any package holding liquids.

In the accompanying drawings, forming part of this specification, Figure 1 is a side view of my device, the faucet end thereof being shown in section, the device in this figure being shown in operation. Fig. 2 is a side view of the device, the cylinder-valve being shown in section, the device having measured a given quantity of liquid and being out of operation. Fig. 3 is a top view of the central cylinder part holding the valve, and Fig. 4 an end view thereof.

The device consists, essentially, of faucet A, scale B, cylinder C, and weight D. Faucet A and cylinder C may be made in one piece, and usually this is the case, the scale rod or beam B being screwed into an offset E on the cylinder C. The faucet A may be made in any shape desired, and at its end or mouth carries a lug F, on which the bucket or measure G is hung. A scale-weight D moves back and forth on the scale B, it being adjusted by a set-screw H. The scale is marked on the scale-beam B. The faucet A has the outlet-orifice J, reaching from the cylinder C to the exit at the mouth of the faucet. The cylinder C has within it the cylinder-valve K. This valve is cylindrical in shape and has port or valve-opening M. To the inner cylinder K is rigidly attached a short supply-pipe N. The cylinder C at each end is closed by caps P, which may be screwed onto the cylinder, if desired. On the supply-pipe N are two guards R and S, and on the rear of the caps P is placed the stop-finger T. The supply-pipe N is forced into the keg or barrel W or connected in some manner to the supply-tube when a beer-pump is used, and the cylinder K being attached to this pipe N the cylinder and pipe are stationary when in use, the faucet moving around them when tilted up and down. This tilting or upward-and-downward path of the faucet is regulated by the stop-finger T coming in contact with the guards R and S, which are also stationary, being on the pipe N.

It will be seen that the cylinder C, carrying faucet A and scale B, moves around the inner valve-cylinder K.

The device operates as follows: It is of course first attached to a keg or barrel or beer-pump supply-pipe or any supply-pipe leading to a liquid reservoir or package. If used on a pipe, it is screwed or otherwise tightly connected. If used on a keg, the supply-pipe N is forced in by striking outer cap P of the cylinder C with a mallet, just as an ordinary faucet is driven home. When not in use, the device hangs down, as shown in Fig. 2, the outlet orifice or passage J being away from the outlet-port M of the cylinder K. Thus the supply is cut off. When a customer comes in, the weight D is adjusted on the scale-beam B at the proper place to give the desired weight or measure of liquid. The device is then tilted up to the horizontal position shown in Fig. 1. When this position has been reached, the outlet or exit orifice reaches the outlet-port M of the cylinder-valve K and a continuous outlet-passage is formed from the supply-pipe, the liquid passing out and flowing into bucket or measure G. As soon as this is filled to a degree of weight to overcome the weight D (which has been previously set) it automatically drops downward, cutting off the supply by moving the outlet-orifice J away from the outlet-port M, the device then assuming the position shown in Fig. 2. The measuring-bucket can be then removed and the liquid poured into the receptacle brought by the customer.

In the operation just described the stop-finger T moves with the faucet and when up, as shown in Fig. 2, rests against the guard S to keep it from tilting backward or upward any farther, and when down, as shown in Fig. 1, the stop-finger T rests on guard R to keep it from moving out of a perpendicular line and tilting too far. I may use a regulation measure G or use any other measure.

In drawing liquids in glasses or given-sized receptacles all that is necessary is for the operator to tilt the device up and hold the glass or the like under the exit-orifice J till it is filled and then let go of the faucet. It will automatically fall and cut off the supply, thus being used as an ordinary faucet.

It may be made of any shape desired and connected in any desired manner.

What I claim as new and of my invention, and desire to secure by Letters Patent, is—

1. The combination of faucet and scale-beam B, connected together and lying in the same plane, and a cylinder-valve K, having a port M, with a stop-finger T, and guards R and S, the measuring vessel hanging on the faucet itself, the device being in a vertical position when not in use and being in a horizontal position when in use, substantially as set forth.

2. The combination of faucet and beam B, lying in the same plane, cylinder-valve K, outer cylinder C, said valve having a port M, stop-finger T, and guards R, and S, the measuring vessel hanging on the faucet itself, the device being in a vertical position when not in use and being in a horizontal position when in use, substantially as set forth.

EDWARD GRUENINGER.

Witnesses:
    OSCAR C. DODSON,
    W. F. LAW.